July 6, 1954     W. B. PUSEY     2,683,066
UNIT HUB AND BEARING ASSEMBLY
Filed June 4, 1951
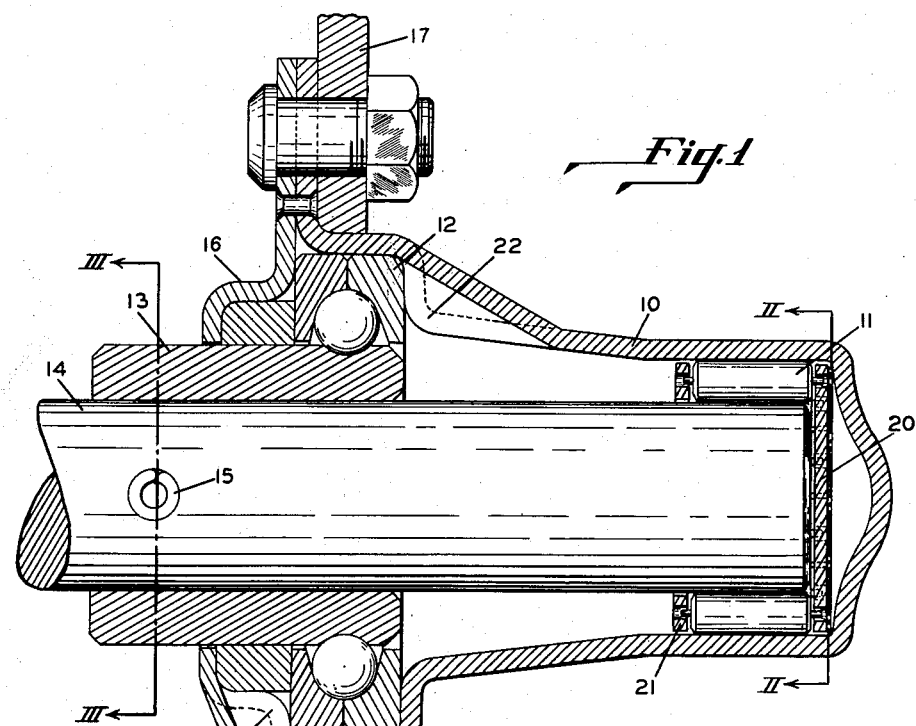
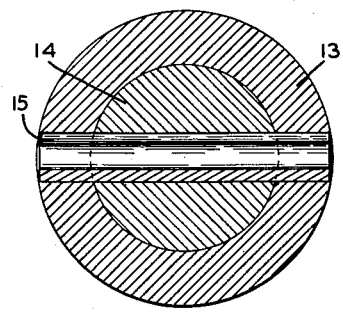
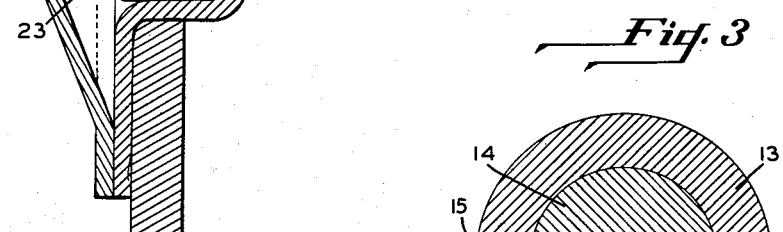
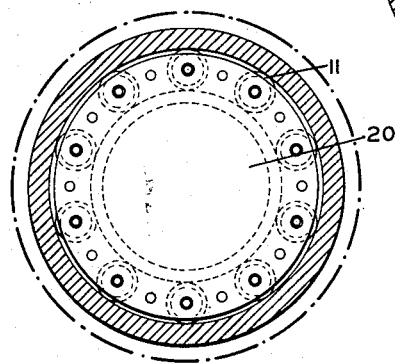
INVENTOR
WESLEY B. PUSEY
ATTORNEY Patented July 6, 1954

2,683,066

UNITED STATES PATENT OFFICE 2,683,066

UNIT HUB AND BEARING ASSEMBLY

Wesley B. Pusey, Lancaster, Pa., assignor to Federal-Mogul Corporation, Detroit, Mich., a corporation of Michigan Application June 4, 1951, Serial No. 229,844

5 Claims. (Cl. 308—190)

1

This invention relates to bearing assemblies and more particularly to an inexpensive unitary hub assembly adapted for use with agricultural machines or the like.

Unitary hub assemblies are well known and various combinations of roller and ball bearing means have been provided for use in such assemblies. The present invention is an improvement in this type of equipment and makes available an inexpensive yet quite rugged structure. In addition it includes features which greatly simplify the assembly of the original unit and the mounting of the assembly on an axle.

The invention broadly takes the form of a shaped hub housing or the like adapted to have ball bearing or other types of bearing means seated therein to support substantially all of the axial and radial loads being transmitted through the hub to the axle and the housing having an outwardly formed cylindrical cup integral therewith that is adapted to enclose the end of the axle and support a journal or pilot roller cage assembly therein. The ball bearing and roller bearing assemblies are preferably both selected to have the same bore for mounting on the cylindrical end of the axle, and the entire hub assembly may be simply slipped over the end of the axle and pinned in place.

An important feature of the invention resides in the particular construction of the cage of the roller bearing wherein the outermost ring of the roller cage is made to serve as a stop for holding the pilot bearing relatively fixed against longitudinal movement at the end of the axle. This ring is constructed to engage the end of the axle to prevent the pilot roller cage assembly from sliding inwardly along the axle thus eliminating the necessity of performing relatively expensive machining operations on the axle to form a seat for the pilot bearing means.

The preferred form of the invention is shown in the drawings wherein:

Figure 1 is a sectional elevation showing the hub housing together with the relative positions of the roller cage assembly and a ball bearing supporting means;

Figure 2 is a view taken on line 2—2 of Figure 1; and

Figure 3 is a view taken on line 3—3 of Figure 1.

Referring now to the details of the preferred form of the invention as it may be included in the structure for the hub assembly, which is adapted to be quickly and easily installed on the axles of agricultural machines and the like during the manufacture thereof and which is equally serviceable as a replacement part, the construction basically takes the form of a housing 10 which is adapted to have a pilot or journal roller cage assembly 11 mounted in its cup shaped smaller end. At the opposite end of the housing, as here shown, a ball bearing assembly is fixed in the housing to absorb axial and radial loads, the ball bearing construction being of conventional design having races 12 fitted around the outside of the balls and having an elongated inner race 13. The race 13 is adapted to slide over the axle 14 when the assembly is initially mounted on the axle during manufacture of the machine and referring to Figure 3, the race 13 and axle have aligned holes drilled therethrough that are adapted to receive a pin 15, to hold the hub assembly on the axle as will appear more fully below. The ball bearing structure is completed by fixing a cap 16 on the housing 10 to hold the ball bearing assembly together. It is apparent of course that other forms of bearings may be used in place of the ball bearing assembly, such as tapered roller bearings or the like.

The wheel 17 of the machine is mounted on the hub assembly so that substantially the entire radial and axial loads are carried by the ball bearing means while the roller cage assembly which is disposed somewhat outwardly therefrom engages the tip end of the axle and serves as a pilot or a journal roller bearing to relieve the ball bearing from having to absorb all of the tilting load. An essential feature of the present invention is concerned with the particular structure of the pilot bearing or journal bearing which includes an improved cage assembly that serves also to hold the roller bearing means in a fixed longitudinal position relative to the end of the axle.

The pilot bearing, as above explained, is fitted into the enclosed cup like end of housing 10 so that the rollers 11 engage the outer surface of the axle 14 and the inner periphery of the housing 10. The pilot bearing is made up of the rollers 11 which are carried in a cage, as is conventional, the cage including the end rings 20 and 21 which serve to confine the rollers 11 when the rings are held together in spaced relation by suitable spacer rods situated between the rollers and fixed at their ends to the rings.

The important feature of this construction is concerned with the ring 20 disposed on the bearing at the outer end of the axle, which is of a size to extend inwardly past the inner surface of the bore of the roller bearing as clearly shown in Figure 2 of the drawings. The ring 20 is constructed in this manner, in order that it will engage against the end of the axle 14 whenever the roller bearing tends to slide longitudinally inwardly along the axle. The ring 20 is confined between the closed end of housing 10 and the outer end of the axle so that the journal bearing is restrained whereby it can move longitudinally in a very limited path only at the end of the axle. With this structure, no shoulder need be provided at the end of axle 14 for seating the journal bearing and yet the bearing is confined to a proper path of movement at the end of the axle.

In the formation of the hub housing, suitable stiffening and supporting ribs 22 and 23 may be provided in the members 10 and 16 to stiffen the hub assembly and also to serve as supports for the rings 12 that form the outer race of the ball bearing structure.

The useful function of the structure above described is quite evident from a reading of the description given above and an inspection of the drawings. Its utility is inherent in the unitary hub assembly structure that is designed so that it may be quickly positioned by merely sliding it onto the cylindrical end portion of an axle so that the ball bearing means supports the substantial load of the machine while the journal bearing assembly is confined at the outer end of the hub to relieve the ball bearing of the tilting load. To simplify the assembly, the inner race 13 of the ball bearing has a bore of just the right size to slip over the axle 14 and the roller bearing assembly 11 is designed to have a bore equal to the diameter of the axle so that no special machining operations are required to effect an easy mounting of the hub assembly on the axle. The ring 20 serves to maintain the journal roller bearing in its position adjacent the end of the axle during the initial placement of the hub on the axle and all the while the assembled hub and axle are in use.

The above described structure may be simply slid in place over a cylindrical axle and the expansible pin 15 driven home through the holes provided in the extending end of the inner ring or race 13 and axle 14. The simplified hub assembly and means for mounting the hub on a cylindrical stub of an axle together with the particular cage structure for the roller bearing, provides a unit hub assembly having great utility. The use of an outer cage ring substantially like the ring 20 to prevent the journal bearing from moving inwardly along the axle is the essential feature which contributes to all of the advantages discussed herein.

The above description covers the preferred form of the invention. The herein disclosed journal cage assembly, however, may be used in other combinations wherever a roller bearing is needed at the end of a shaft and where it is desirable to eliminate the necessity for machining a shoulder on the axle to hold the roller bearing against endwise movement along the axle. This and many other modifications of the invention may occur to those skilled in the art which will fall within the scope of the following claims.

I claim:

1. A roller bearing assembly and an enclosing housing, said roller bearing assembly having a bore of a size for mounting on the end of a cylindrical shaft, said housing being adapted to be rotatably mounted on said shaft but being fixed against longitudinal movement relative thereto, said assembly comprising a cage for retaining the rollers, said cage including a ring on one side at least a portion of which extends inwardly past the inner surface of the bore of the roller bearing assembly, and said assembly being adapted to be slipped over the end of said shaft with said one ring disposed outwardly so that when said assembly is placed on the end of said shaft said one ring will engage against the end of the shaft whereby to prevent the assembly from sliding inwardly longitudinally along the shaft past the end portion thereof, means to hold said housing fixed against outward longitudinal movement along said shaft, and said one ring being adapted to engage the outer end wall of said enclosing housing to limit the axial movement of said cage in an outward direction.

2. A unitary hub assembly for mounting on the end of an axle, said assembly including a hub housing having a bearing means adapted to absorb radial and axial loads and support the hub on said axle, and a pilot roller bearing assembly for cooperating with said first named bearing means and said housing, said roller bearing assembly comprising a cage for retaining the rollers, said cage including a ring on one side at least a portion of which extends inwardly past the inner surface of the bore of the roller bearing assembly, and said pilot roller bearing assembly being disposed in said housing so that said bearing rides on the axle with said ring being carried between the end of the axle and said housing, whereby said assembly may be fitted over said axle and the ring will hold the pilot bearing assembly relatively fixed against longitudinal movement along the axle.

3. A unitary hub assembly for mounting on the end of an axle, said assembly including a generally cylindrical housing having an enclosed cup shaped outer end, a bearing means adapted to absorb radial and axial loads mounted in the housing for supporting the hub on said axle, a pilot roller bearing assembly mounted in said cup shaped end for cooperating with said first named bearing means and said housing, said roller bearing assembly including a cage for retaining the rollers, said cage having a ring on its outer end at least a portion of which extends inwardly past the inner surface of the bore of the roller bearing assembly, and said pilot roller bearing assembly being disposed in said housing so that said assembly rides on the axle with said ring being carried between the end of the axle and said enclosed end of the housing, whereby said assembly may be fitted over said axle and the ring will hold the pilot bearing assembly relatively fixed against longitudinal movement along the axle.

4. A unitary hub assembly for mounting on the end of an axle, said assembly including a hub housing, a bearing means adapted to absorb axial and radial loads and to support the hub on said axle, said bearing means having a bore equal to the diameter of said axle, a pilot roller bearing assembly for cooperating with said first named bearing means and said housing, said pilot bearing having a bore equal to the internal diameter of said first named bearing means, said roller bearing assembly including a cage for retaining the rollers, said cage having a ring on one side at least a portion of which extends inwardly past the inner surface of the bore of the pilot roller bearing means, and said pilot roller bearing assembly being disposed in said housing so that said assembly rides on the axle with said ring being carried between the end of the axle and said housing, whereby said assembly may be fitted over said axle and the ring will hold the pilot bearing assembly relatively fixed against longitudinal movement along the axle.

5. A unitary hub assembly for mounting on the end of an axle, said assembly including a two piece hub housing, a ball bearing means including a pair of separable ring means forming an outer race for the ball bearings of said ball bearing means, said pieces of said housing being shaped to fixedly support said rings, a pilot roller bearing assembly for cooperating with said ball bearing means and said housing, said roller bearing assembly including a cage for retaining the rollers, said cage having a ring on one side at least a portion of which extends inwardly past the inner surface of the bore of the roller bearing assembly, and said pilot roller bearing assembly being disposed in said housing so that said assembly rides on the axle with said ring being carried between the end of the axle and said housing, whereby said assembly may be fitted over said axle and the ring will hold the pilot bearing relatively fixed against longitudinal movement along the axle.

References Cited in the file of this patent

UNITED STATES PATENTS

| Number | Name | Date |
|---|---|---|
| 1,066,752 | Perkins | July 8, 1913 |

FOREIGN PATENTS

| Number | Country | Date |
|---|---|---|
| 14,616 | Sweden | Oct. 12, 1901 |